United States Patent
Salesse-Lavergne

(10) Patent No.: US 9,493,234 B2
(45) Date of Patent: Nov. 15, 2016

(54) METHOD AND A SYSTEM FOR DETERMINING AN ANGULAR VELOCITY IN TURNING FOR A ROTARY WING AIRCRAFT

(71) Applicant: AIRBUS HELICOPTERS, Marignane (FR)

(72) Inventor: Marc Salesse-Lavergne, Allauch (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/964,796

(22) Filed: Dec. 10, 2015

(65) Prior Publication Data

US 2016/0176522 A1 Jun. 23, 2016

(30) Foreign Application Priority Data

Dec. 18, 2014 (FR) ...................... 14 02910

(51) Int. Cl.
| | |
|---|---|
| *G05D 1/08* | (2006.01) |
| *G01P 5/00* | (2006.01) |
| *G05D 1/02* | (2006.01) |
| *B64C 27/57* | (2006.01) |
| *G01P 3/00* | (2006.01) |

(52) U.S. Cl.
CPC ............... B64C 27/57 (2013.01); G01P 3/00 (2013.01); G01P 5/00 (2013.01); G05D 1/0204 (2013.01); G05D 1/0808 (2013.01); G05D 1/0858 (2013.01)

(58) Field of Classification Search
CPC .............. B64C 27/57; G01P 3/00; G01P 5/00; G05D 1/0808; G05D 1/0204; G05D 1/0858
See application file for complete search history.

(56) References Cited

U.S. PATENT DOCUMENTS

| 3,603,531 | A | * | 9/1971 | Brucker-Steinkuhl F41G 7/2213 244/3.16 |
|---|---|---|---|---|
| 5,001,646 | A | | 3/1991 | Caldwell et al. |
| 5,213,283 | A | | 5/1993 | Gold et al. |
| 6,259,975 | B1 | | 7/2001 | Rollet et al. |
| 6,622,065 | B2 | | 9/2003 | Mezan |

(Continued)

FOREIGN PATENT DOCUMENTS

| FR | 1347243 | 12/1963 |
|---|---|---|
| FR | 2777535 | 10/1999 |

(Continued)

OTHER PUBLICATIONS

Extended European Search Report Dated May 17, 2016, Application No. 15198678.3-1802, Applicant Airbus Helicopters, 6 Pages.

(Continued)

*Primary Examiner* — Rodney Butler
(74) *Attorney, Agent, or Firm* — Brooks Kushman P.C.

(57) ABSTRACT

A method and a system for determining an angular velocity in turning for a rotary wing aircraft in order to make turns that are coordinated relative to the ground or else relative to the air and in order to manage the transition between ground coordination and air coordination while taking account of the wind to which the aircraft is subjected. The method serving to determine an angular velocity in yaw using an anticipation value and a correction value on the basis in particular of speeds of advance of the aircraft relative to the ground and relative to the air of its lateral acceleration and of its lateral load factor.

15 Claims, 2 Drawing Sheets

(56) References Cited

U.S. PATENT DOCUMENTS

| | | |
|---|---|---|
| 8,977,412 B2 | 3/2015 | Certain |
| 2003/0088342 A1* | 5/2003 | Godard ................ B64D 43/00 701/3 |
| 2012/0253558 A1 | 10/2012 | Christensen et al. |

FOREIGN PATENT DOCUMENTS

| | | |
|---|---|---|
| FR | 2814433 | 3/2002 |
| FR | 2991664 | 12/2013 |
| WO | 9305460 | 3/1993 |
| WO | 9534029 | 12/1995 |
| WO | 2012096668 | 7/2012 |
| WO | 2012134447 A2 | 10/2012 |
| WO | 2012134447 A3 | 10/2012 |
| WO | 2012134460 | 10/2012 |
| WO | 2013012408 | 1/2013 |

OTHER PUBLICATIONS

French Search Report for French Application No. 1402910, Completed by the French Patent Office on Nov. 2, 2015, 8 Pages.

* cited by examiner

METHOD AND A SYSTEM FOR DETERMINING AN ANGULAR VELOCITY IN TURNING FOR A ROTARY WING AIRCRAFT

CROSS REFERENCE TO RELATED APPLICATION

This application claims priority to French patent application No. FR 14 02910 filed on Dec. 18, 2014, the disclosure of which is incorporated in its entirety by reference herein.

BACKGROUND OF THE INVENTION (1) Field of the Invention

The present invention relates to the field of flight control systems for rotary wing aircraft, and more particularly to systems for providing assistance in performing a turn in flight.

The present invention relates to a method of determining an angular velocity in turning for a rotary wing aircraft, and more particularly a method of determining an angular velocity in turning that is coordinated relative to the ground or relative to the air, and also enabling a transition to be achieved between ground coordination and air coordination, while also taking account of any strong lateral wind to which the aircraft might be subjected. The present invention also relates to a system for determining such an angular velocity in turning for a rotary wing aircraft.

(2) Description of Related Art

Rotary wing aircraft are aircraft that differ from other powered aircraft mainly by their ability to travel not only in cruising flight at high speeds, but also at low speeds or while hovering. This capacity is made available by using at least one main rotor of the aircraft, which rotor has an axis of rotation that is substantially vertical.

The main rotor constitutes a rotary wing providing the aircraft with lift and possibly also with propulsion. The behavior of the rotary wing aircraft in flight can be modified by varying the cyclic pitch and/or the collective pitch of the blades of the rotary wing. A variation in the cyclic pitch of the blades modifies the behavior of the aircraft in terms of attitude, and more particularly in pitching and/or in roll. A variation in the collective pitch of the blades leads to a modification in the behavior of the aircraft in terms of lift, making it possible in particular to generate movements along an axis that is substantially vertical, and also along its pitching and roll axes, depending on the attitude of the aircraft.

A rotary wing aircraft can also be maneuvered in yaw, even while stationary, by using a yaw anti-torque device. For example, such an anti-torque device is formed by a tail rotor having an axis of rotation that is substantially horizontal and located at the rear of the aircraft. Such a tail rotor has a plurality of blades, and as a general rule it is only the collective pitch of the blades that can be varied, even though it is also possible for the cyclic pitch to be variable.

A rotary wing aircraft generally has a single main rotor and a single anti-torque tail rotor. Nevertheless, a rotary wing aircraft may also have two contrarotating main rotors, e.g. in tandem or else on the same axis, in which case no anti-torque device is necessary.

Furthermore, a hybrid helicopter is a rotary wing aircraft having at least one main rotor, that serves mainly to provide it with lift and to a smaller extent with propulsion, and at least one specific propulsion means such as a propulsive propeller. Such a hybrid helicopter enables large distances to be covered while traveling at a high speed of advance. The anti-torque device of such a hybrid helicopter may be formed by at least one of its propulsive propellers. Such a propulsive propeller has a plurality of blades, and as a general rule only their collective pitch is variable.

Furthermore, a rotary wing aircraft may have aerodynamic elements such as stabilizers, or even wings, particularly in hybrid helicopters. These aerodynamic elements may have moving parts and they can participate in making the aircraft maneuverable, in particular in cruising flight at high speeds of advance.

The flight behavior of a rotary wing aircraft can be varied by modifying various flight parameters of the aircraft. These flight parameters include in particular cyclic and/or collective pitch values for the main rotors and the collective pitch value for the anti-torque rotor and/or the propulsion means, and the aerodynamic elements, if any. These flight parameters can be modified in this way in various control modes.

In a manual control mode the pilot of the rotary wing aircraft has control levers that the pilot of the aircraft moves manually in order to vary the flight parameters, and in particular the cyclic and/or collective pitch of the blades of the various rotors by means of manual control linkages. The concept of "manual" should be considered in opposition to the concept of "automatic", without prejudice to the means used by a person for maneuvering the aircraft, which means may in particular be pedals, a control stick, or a joystick.

In an embodiment of a manual control mode, control levers engage respective linkages for mechanically transmitting forces remotely, so as to enable the pilot of the rotary wing aircraft to act mechanically on the blades by using control levers, either directly, or else via servo-controls.

In another embodiment of a manual control mode, the pilot moving a control lever serves to generate electrical signals for activating at least one servo-control for moving the blades.

In an automatic control mode, an autopilot generates control signals for those flight parameters and in particular for varying the pitch of the blades of the various rotors by using automatic control linkages. When the autopilot is activated, the control signals take the place of the control signals generated by the pilot acting directly on the control levers for activating the servo-controls.

The autopilot enables the rotary wing aircraft to maintain stable progress in application of previously stored flight setpoints. The actual state of progress of the aircraft is evaluated by the autopilot at a given instant by means of information supplied by a variety of instrumentation on board the aircraft. On the autopilot detecting a difference between the flight setpoints and the actual state of progress of the aircraft, the autopilot acts on the flight behavior of the rotary wing aircraft by means of one or more flight parameters in order to re-establish its actual state of progression in compliance with the flight setpoints.

The pilot of the rotary wing aircraft activates the autopilot by using one or more specific control buttons.

In a stabilization mode performed by the autopilot, an initial setpoint for maintaining the attitude of the rotary wing aircraft may, for example, be defined relative to the state of progression of the aircraft as evaluated from activation of the autopilot. Stabilization mode serves to stabilize the aircraft by the autopilot correcting the attitude of the aircraft relative to the initial setpoint.

In a particular mode of piloting by transparency, the pilot may possibly intervene temporarily on the behavior of the aircraft by using control levers and overriding the control signals generated by the autopilot. The initial flight setpoints are unaffected, any temporary intervention by the pilot on the behavior of the aircraft not leading to any modification to the initial flight setpoints.

It is also known to correct a flight setpoint, such as a setpoint for maintaining attitude, as a function of the actual state of progression of the rotary wing aircraft after the pilot has acted on the control levers. It is also known to enable the pilot of the aircraft to correct an attitude maintaining setpoint by varying the value of that setpoint incrementally, the pilot making use of one or more dedicated control members. For example, two control members may be used of the kind commonly known as "beeps". For example, such control members may be positioned respectively on a collective pitch control lever and on a cyclic pitch control lever generally referred to as a "stick".

Document FR 1 347 243 describes a device for piloting by transparency that enables the pilot to take action either with a return to the initial flight setpoints after the pilot's action ceases or else with new flight setpoints being stored that take account of the action of the pilot.

Also known is Document FR 2 991 664, which describes an automatic system for providing piloting assistance that enables a flight parameter to be maintained on a progression axis of the aircraft while taking account of the action of the aircraft pilot on at least one other axis by using flight control levers while the autopilot of the aircraft is in operation. Various modes of guidance can be selected by the pilot, e.g. giving priority to maintaining a vertical speed or a speed of advance or indeed maintaining heading, angle of attack, or flight path angle.

Furthermore, Document U.S. Pat. No. 5,001,646 describes an automatic control system enabling the pilot to act on the progression of the aircraft by means of a four-axis control member. The pilot can then control longitudinal, lateral, and vertical accelerations of the aircraft and also its angular speed in yaw, while conserving firstly, at a low speed of advance, a speed relative to the ground that is independent of the heading being followed, and secondly, at a high speed of advance, a coordinated turn and a flight path angle.

The rotary wing aircraft is stabilized using basic modes, in which, by way of example, the autopilot generates an increase in stability by damping angular movements of the aircraft, or indeed it serves to maintain attitude or heading. The basic modes provide piloting comfort for the pilot of the rotary wing aircraft, but they do not correct for potential differences relative to the speed or position the pilot desires for the aircraft. Proposals have thus been made to associate higher modes of operation with the basic modes in order to eliminate potential differences in position, speed, and/or acceleration of the aircraft compared with the values desired by the pilot. These desired values are input in the form of flight setpoints that the higher autopilot modes use for bringing the aircraft to the desired position, speed, and/or acceleration, and for maintaining it. The operation of stabilizing the aircraft obtained using the basic modes is performed quickly by the autopilot, whereas the operation of re-establishing position, speed, and/or acceleration of the rotary wing aircraft is performed subsequently and more slowly by the higher modes.

By way of example, Document WO 95/34029 describes a flight control system for an aircraft enabling the speeds of the aircraft to be stabilized by operating the controls relative to the yaw, roll, and pitching axes and also relative to lift, while maintaining a heading that is constant.

The autopilot can also provide advanced functions of assisting in the guidance of the rotary wing aircraft. The possibilities made available by the higher modes are also used to obtain such assistance. The ways in which advanced functions are executed depend on predefined capabilities of the autopilot relating to the setpoint track that is to be followed by the aircraft.

Specifically, such higher autopilot modes are designed to perform instrument flight rules (IFR) operations, i.e. for piloting that can be performed solely with the assistance of flight instruments and can thus be performed with degraded vision outside the aircraft, or indeed with no outside vision.

In contrast, visual flight rules (VFR) operations are performed when the pilot can control the aircraft by looking outside the aircraft and not only with the help of instruments and flight assistance.

By way of example, the setpoint track as used for a flight mission may be determined by the pilot of the rotary wing aircraft, or else during a stage of approaching a site that is known and identified. Such a site is provided in particular with means providing interactivity between the site and the autopilot, such as radio navigation beacons. In the absence of such interactive equipment, the site is identified by the pilot of the aircraft in manual mode, and then the pilot of the aircraft activates the desired advanced functions.

The operating capabilities of the autopilot make it possible to provide automatic piloting assistance by correcting the attitude of the rotary wing aircraft in cruising flight, at high speeds of advance, and when the aircraft is in a position that is remote from the ground. In a stage of cruising flight, the surroundings of the aircraft are normally empty and the pilot of the aircraft does not need to pay sustained attention to the maneuvering of the aircraft. The pilot can also avoid such sustained attention close to the ground in surroundings that are known by making use of an advanced function of the autopilot, such as during a stage of approaching a landing ground that is known and/or provided with means for identifying its surroundings.

Likewise, during a stage of approaching an intervention site that is known to the autopilot and that has been recognized and identified, activation of an advanced function is made possible, even at low speeds, for guiding the rotary wing aircraft along the corresponding setpoint track.

In addition, like a person piloting an aircraft, the autopilot conventionally controls the longitudinal, lateral, and vertical speeds of the aircraft respectively by the longitudinal cyclic pitch, the lateral cyclic pitch, and the collective pitch of the main rotor, and the collective pitch of an anti-torque rotor controlling the orientation of the aircraft about its yaw axis. These longitudinal, lateral, and vertical speeds are defined in a reference frame tied to the aircraft having axes that are formed by the longitudinal, lateral, and vertical directions of the aircraft.

Furthermore, an autopilot can also enable the aircraft to perform coordinated turns. A coordinated turn is a turn performed without the aircraft drifting from the turn track relative to the ground, which is ground coordination, or else without any lateral load factor, which is air coordination.

With ground coordination, a turn is coordinated relative to the ground. The aircraft does not drift relative to the ground, thus enabling it to follow a ground track accurately. Such a turn that is coordinated relative to the ground is preferably used at low speed and low altitude so as to move safely in the proximity of terrain in relief or buildings, with the nose of the aircraft generally remaining in alignment with the ground track.

With air coordination, a turn is coordinated relative to the air. The aircraft does not drift relative to the air, thereby giving preference to the comfort of its occupants and minimizing the sideslip of the aircraft. Such a turn that is coordinated relative to the air is preferably used in cruising flight, i.e. at high speed and high altitude, and far away from any obstacles.

Document U.S. Pat. No. 5,213,283 describes a control system for performing a coordinated turn. That control system automatically supplies a yaw control signal in response to the pilot issuing a banking control signal while making such a coordinated turn, with the pilot's workload thus being reduced.

In addition, Document WO 2012/134447 describes a flight control system for an aircraft enabling a coordinated turn to be performed throughout the flight envelope, thereby minimizing the pilot's workload. At high speed, that control system makes use firstly of changes in the angle of attack of the aircraft to control heading and also lateral acceleration, and secondly of the air speed of the aircraft for controlling heading, so as to perform a coordinated turn relative to the air. At low speed, the control system makes use of the sideslip angle of the aircraft in order to maintain the heading in alignment with the track of the aircraft, thus performing a coordinated turn relative to the ground. In a transition zone between those two flight envelopes, the sideslip angle of the aircraft and its lateral acceleration are used to maintain the aircraft in a coordinated turn.

Furthermore, rotary wing aircraft are powered aircraft designed to be capable of flying in a variety of conditions that can sometimes be difficult, both in terms of atmospheric conditions, such as the presence of a strong wind and varying visibility conditions, and in terms of flight conditions, such as flying at low speeds or hovering, or indeed conditions involving the surroundings, such as being close to ground that is unknown or poorly known.

In difficult flight conditions, the pilot of the rotary wing aircraft is likely to need to take account of unexpected factors. It can then be awkward, or even impossible, for the pilot of the aircraft to make use of automatic assistance in maneuvering the aircraft under such difficult flying conditions. For example, when the aircraft is close to the ground, it must be possible for any change in its behavior to be implemented quickly. When the autopilot is using an advanced function implementing its higher modes of operation, it has difficulty in implementing a rapid modification to a track that is to be followed by the aircraft.

Under such difficult flying conditions, the use of IFR piloting can be dangerous and VFR piloting is to be preferred, but the pilot can nevertheless make use of assistance and/or certain instruments of the aircraft. Such conditions include in particular visual meteorological conditions (VMC) and degraded visual environment (DVE) conditions. The pilot may then find it necessary to make frequent adjustments to the speed and/or the track of the aircraft in order to avoid possible obstacles and in order to approach particular positions, e.g. if there is a strong side wind.

Document FR 2 777 535 describes a flight control system for an aircraft that makes it possible in particular to control lateral speed relative to the ground while maintaining a constant heading, e.g. for the purpose of compensating a strong side wind. That control system also makes it possible to maintain a constant direction for the speed of the aircraft, and thus for its track, while changing its heading and/or its longitudinal speed.

Furthermore, Document WO 2012/134460 describes a flight control system for an aircraft that makes it possible at a low speed to maintain a track that is constant relative to the ground while changing heading. The control system acts on the pitching and roll controls in order to maintain the track, with the pilot being able to cause the aircraft to move in rotation at any moment by means of those controls.

Likewise, Document WO 2012/096668 describes a flight control system for an aircraft that makes it possible to control the vertical speed of the aircraft, its flight path angle relative to the ground, and/or a height relative to the ground depending on its speed of advance. Below a predetermined speed of advance threshold, corresponding to a flight situation close to hovering, the flight control system makes it possible to maintain a height relative to the ground. Above that predetermined speed of advance threshold, the flight control system then enables a vertical speed of the aircraft to be maintained or else it enables a flight path angle relative to the ground to be maintained.

Furthermore, Document FR 2 814 433 describes a flight control device for an aircraft in which an action on a control member can have different effects depending on the speed in translation of the aircraft. Thus, if this speed in translation of the aircraft is less than or equal to a predetermined threshold, an action on the control member acts directly on the speed in translation. In contrast, if the speed in translation of the aircraft is greater than the predetermined threshold, then an action on the control member acts, by way of example, on the acceleration in translation of the aircraft, or indeed on its angular speed.

Finally, Document WO 2013/012408 describes a flight control system for an aircraft that makes it possible automatically for the aircraft to engage hovering flight starting from forward flight, and also enables a position to be maintained in hovering flight.

BRIEF SUMMARY OF THE INVENTION

An object of the present invention is thus to provide a method of determining an angular velocity in turning for a rotary wing aircraft, and also a system for determining such an angular velocity in turning, both the method and the system enabling a turn to be performed that is coordinated relative to the ground or to the air and also enabling a turn to be performed in a transition zone between ground coordination and air coordination, while avoiding the above-mentioned limitations.

According to the invention, a method of determining an angular velocity in turning for a rotary wing aircraft is for a rotary wing aircraft having at least one control means and an autopilot that generates control signals in compliance with predefined modes of operation and with flight setpoints. These control means may for example be control levers or sticks and pedals, or indeed control members such as "beeps".

The aircraft is characterized by three preferred directions, a longitudinal direction X extending from the front of the aircraft towards the rear of the aircraft, an elevation direction Z extending upwards perpendicularly to the longitudinal direction X, and a transverse direction Y extending from right to left perpendicularly to the longitudinal and elevation directions X and Z.

The longitudinal direction X is the roll axis of the aircraft, the transverse direction Y is its pitching axis, and the elevation direction Z is its yaw axis.

The aircraft has at least one rotary wing provided with a plurality of main blades of pitch that is variable collectively and cyclically about respective pitch axes, enabling the aircraft to perform movements in rotation about those directions X, Y, Z and movements in translation along those directions X, Y, Z. The control signals from the autopilot can give rise to these movements of the aircraft in rotation and/or in translation relative to the directions X, Y, Z.

The aircraft generally follows a track $T_{sol}$ that is determined relative to the ground in order to reach a target on the ground, such as a landing ground. It is considered that the aircraft is following a track $T_{sol}$ when its center of gravity follows that track $T_{sol}$. The track $T_{sol}$ is defined in a terrestrial geographical reference frame, i.e. a reference frame that is stationary relative to the terrestrial globe, with the aircraft moving in that frame. By way of example, the terrestrial geographical reference frame may be based on cardinal points, e.g. the north and west directions, together with a vertical direction such as the direction of terrestrial gravity.

An aircraft flies along this track $T_{sol}$ at a speed of advance $V\alpha$. The speed of advance $V\alpha$ of the aircraft is its speed along the direction of the track $T^{sol}$ and it may be the speed of advance of the aircraft relative to the ground $V\alpha_{sol}$ or it may be the speed of advance of the aircraft relative to the air $V\alpha_{air}$.

The speed of advance for the aircraft relative to the ground $V\alpha_{sol}$ is generally used as the speed of advance $V\alpha$ while flying at low altitudes, i.e. when the aircraft is close to obstacles such as terrain in relief and buildings. The speed of advance of the aircraft relative to the air $V\alpha_{air}$ is used as the speed of advance $V\alpha$ essentially during cruising flight at high attitudes, i.e. when the aircraft is far away from any obstacles.

A cruising flight of an aircraft along the track $T_{sol}$ is generally characterized by a speed of advance $V\alpha$, a ground course angle $Tk_{sol}$ measured relative to the north direction in a horizontal plane in the terrestrial geographical reference frame, a flight path angle P giving the angle of inclination of the direction of the track $T_{sol}$ relative to that horizontal plane in the terrestrial geographical reference frame, and a heading $\psi$.

The heading $\psi$ of the aircraft is the angle made between the north direction and the projection onto the horizontal plane of the terrestrial reference frame of the longitudinal direction X of the aircraft. Thus, when the heading $\psi$ and the ground course angle $Tk_{sol}$ are equal, the nose of the aircraft points along the track $T_{sol}$. As a result, the longitudinal direction X is then in alignment with the track $T_{sol}$. Otherwise, the nose of the aircraft does not lie on the track $T_{sol}$ and the track $T_{sol}$ is not in alignment with the longitudinal direction X, it being understood that a rotary wing aircraft is capable in particular of advancing in any direction independently of its longitudinal direction X.

The method of determining an angular velocity in turning for a rotary wing aircraft is remarkable in that:
determining a longitudinal speed $V_{Long}$ for use in determining an anticipation value A for an angular velocity in yaw $\dot{\psi}$ of the aircraft to apply during the turn, such that:
the longitudinal speed $V_{Long}$ is equal to the longitudinal speed of advance of the aircraft relative to the ground $(V\alpha_{sol})_{Long}$ such that $V_{Long}=(V\alpha_{sol})_{Long}$ when the longitudinal speed of advance of the aircraft relative to the ground lies strictly within a first interval Int1 centered on a longitudinal speed of advance of the aircraft relative to the ground $(V\alpha_{air})_{Long}$ and of width $D_{int1}$;
the longitudinal speed $V_{Long}$ is equal to a high first boundary of the first interval Int1 when the longitudinal speed of advance of the aircraft relative to the ground $(V\alpha_{sol})_{Long}$ is greater than or equal to the high first boundary, the high first boundary being equal to the longitudinal speed of advance of the aircraft relative to the air $(V\alpha_{air})_{Long}$ plus a margin Offset equal to half of the width $D_{int1}$, such that:

$$\text{Offset} = \frac{D_{int1}}{2}$$

and $$V_{Long} = (V\alpha_{air})_{Long} + \frac{D_{int1}}{2}$$

the longitudinal speed $V_{Long}$ is equal to a low first boundary of the first interval Int1 when the longitudinal speed of advance of the aircraft relative to the ground $(V\alpha_{sol})_{Long}$ is less than or equal to the low first boundary, the low first boundary being equal to the longitudinal speed of advance of the aircraft relative to the air $(V\alpha_{air})_{Long}$ minus the margin Offset such that:

$$V_{Long} = (V\alpha_{air})_{Long} - \frac{D_{int1}}{2}$$

determining the anticipation value A for the angular velocity in yaw $\dot{\psi}$ such that:

$$A = \frac{G_Y}{V_{Long}}$$

where $G_y$ is a lateral acceleration of the aircraft under the control of a pilot of the aircraft;
determining a lateral speed $V_{Lat}$ for use in determining a correction value B of the angular velocity in yaw $\dot{\psi}$ for application during the turn, such that:
the lateral speed $V_{Lat}$ is equal to a lateral speed of advance of the aircraft relative to the ground $(V\alpha_{sol})_{Lat}$ such that $V_{Lat}=(V\alpha_{sol})_{Lat}$ when the lateral speed of advance of the aircraft relative to the ground $(V\alpha_{sol})_{Lat}$ lies strictly within a second interval Int2 bounded firstly by a low second boundary of the second interval Int2 equal to a first product of a first multiplier coefficient $K_1$ multiplied by a lateral load factor Ny of the aircraft minus a low margin $\text{Offset}_{Lo}$, and secondly by a high boundary of a second interval Int2 equal to the first product of the multiplier coefficient $K_1$ multiplied by the lateral load factor Ny plus a high margin $\text{Offset}_{Hi}$;
the lateral speed $V_{Lat}$ is equal to the high second boundary of the second interval Int2 when the lateral speed of advance of the aircraft relative to the ground $(V\alpha_{sol})_{Lat}$ is greater than or equal to the high second boundary, such that:

$$V_{Lat}=K_1 \times Ny + \text{Offset}_{Hi}$$

the lateral speed $V_{Lat}$ is equal to the low second boundary of the second interval Int2 when the lateral speed of advance of the aircraft relative to the ground $(V\alpha_{sol})_{Lat}$ is less than or equal to the low second boundary, such that:

$$V_{Lat}=K_1 \times Ny - \text{Offset}_{Lo}$$

determining the correction value B for the angular velocity in yaw $\dot{\psi}$ such that:

$$B=K_2 \times V_{Lat}$$

$K_2$ being a second multiplier coefficient; and
determining said angular velocity in yaw so as to follow said track $T_{sol}$ in said turn, such that:

$$\dot{\psi}=A+B.$$

The term "longitudinal speed of advance of the aircraft" relative to the ground or indeed to the air is used to mean a projection onto the longitudinal direction X of the aircraft of the speed of advance of the aircraft relative to the ground or else to the air. Likewise, the term "lateral speed of advance of the aircraft" relative to the ground or to the air is used to mean a projection onto the transverse direction Y of the aircraft of the speed of advance of the aircraft respectively relative to the ground or else to the air.

The rotary wing aircraft has at least one rotary wing with an axis of rotation that is substantially vertical, i.e. parallel to the elevation direction Z, and it may be built with a variety of architectures. By way of example, the aircraft may have a single rotary wing formed by a main rotor providing the aircraft with lift and propulsion, together with an anti-torque tail rotor having an axis of rotation that is substantially horizontal, i.e. parallel to the transverse direction Y. The anti-torque tail rotor also serves to perform maneuvers about the yaw axis.

In another example, the aircraft has two rotary wings formed by two contrarotating main rotors that may either be in tandem or else on the same axis. The aircraft may also have at least one rotary wing, such as a main rotor, providing the aircraft mainly with its lift, and one or more propulsive propellers having axes of rotation that are substantially horizontal, i.e. parallel to the longitudinal direction X and serving to provide the aircraft with propulsion. Such an aircraft then constitutes a hybrid helicopter.

Furthermore, a rotary wing aircraft may include aerodynamic elements such as stabilizers or wings, in particular in hybrid helicopters. Such aerodynamic elements may include moving portions in order to facilitate maneuvering the aircraft, in particular in cruising flight.

Whatever the architecture of the aircraft, the pilot of the aircraft can modify the behavior in flight of the aircraft by acting on one or more control means. By way of example, levers or indeed joysticks serve to vary the cyclic pitch and/or the collective pitch of the main blades. Pedals serve to vary the collective pitch of the secondary blades of a tail rotor whereas a joystick can vary the collective pitch of the secondary blades of at least one propulsive propeller. Furthermore, if aerodynamic elements are present on the aircraft, the pilot of the aircraft may also cause their moving portions to move in order to modify the behavior in flight of the aircraft.

In addition, the autopilot can also modify the flight behavior of the aircraft by means of command signals that it supplies and in compliance with the flight setpoints, so as to vary the cyclic pitch and/or the collective pitch of the main blades, so as to vary the collective pitch of the secondary blades of a tail rotor or indeed of at least one propulsive propeller, and also so as to move movable portions of airfoil elements, if any are present.

During a flight, the rotary wing aircraft is caused to make turns that are processed differently depending on flight conditions and on the environment.

In particular, in cruising flight undertaken at high speed and at sufficient height above the ground, i.e. far from any obstacle, preference is generally given to the comfort of occupants. In order to optimize this comfort, it is appropriate to minimize the lateral load factor of the aircraft. This choice presents the advantage of limiting drift relative to the air in most circumstances of rapid cruising flight. In the few flight circumstances where eliminating the lateral load factor does not suffice to limit drift relative to the mass of air, it may be advantageous to seek to make the measured lateral load factor equal to an estimated value so as to limit this drift relative to the air. That is why this choice of making the lateral load factor equal to a zero value or to a value slightly offset from zero so as to limit drift relative to the air is considered as coordinating the turn relative to the mass of air, even though strictly speaking such coordination implies that the lateral speed of advance of the aircraft relative to the air is measured or estimated accurately and is eliminated. When this lateral speed of advance of the aircraft relative to the air cannot be measured or estimated accurately, the term "air coordination" is still used to represent this lateral load factor being made equal to a value that is zero or little different from zero so as to limit drift relative to the air. On this principle, it is possible to decide to coordinate turns relative to the air as from speeds of advance relative to the air $V\alpha_{air}$ of about 30 knots (kt) to 40 kt, which is the usual situation, or to raise these thresholds to values that may typically lie in the range 65 kt to 75 kt.

The way in which the projection onto a horizontal plane of the lateral speed of advance of the aircraft relative to the air $U_{HY}$ varies is given by the following equation:

$$\dot{U}_{HY} = -\dot{\psi} \cdot U_{HX} + G_{HY}$$

where $U_{HX}$ is the projection onto the same horizontal plane of the longitudinal speed of advance of the aircraft relative to the air $(V\alpha_{air})_{Long}$ and $G_{HY}$ is the projection onto the same horizontal plane of the lateral acceleration $G_y$ of the aircraft. Choosing an angular velocity in yaw $\dot{\psi}$ such that:

$$\dot{\psi} = \frac{G_{HY}}{U_{HX}} + \frac{\omega_0}{U_{HX}} \cdot U_{HY}$$

gives rise to a first order differential equation $$\dot{U}_{HY} = -\omega_0 \cdot U_{HY}$$

that converges exponentially on 0 for $\omega_0 > 0$, with a time constant that is equal to the reciprocal of this coefficient $\omega_0$.

Selecting this angular velocity in yaw $\dot{\psi}$ thus ensures that the turn is coordinated relative to the air. By assuming:

$$\frac{G_Y}{(V\alpha_{air})_{Long}} \approx \frac{G_{HY}}{U_{HX}}$$

where $G_y$ is the lateral acceleration of the aircraft, $(V\alpha_{air})_{Long}$ is the longitudinal speed of advance relative to the air, and approximating the term $$\frac{\omega_0}{U_{HX}} \cdot U_{HY}$$

by the term K×Ny, where Ny is the lateral load factor of the aircraft and K is a multiplier coefficient selected so as to produce a gain $$\frac{\omega_0}{U_{HX}}$$

that varies with the projection of the lateral speed of advance of the aircraft relative to the air and the existing proportionality between Ny and $U_{HY}$, such that:

$$K \times N_y \approx \frac{\omega_0}{U_{HX}} \cdot U_{HY}$$

the following formula is obtained giving the angular velocity in yaw $\dot\psi$ of the aircraft:

$$\dot\psi = \frac{G_Y}{(Va_{air})_{Long}} + K \times Ny.$$

In contrast, in order to follow a ground track accurately, the turn needs to be coordinated relative to the ground. With such ground coordination, the aircraft must not drift relative to the ground, which means that the lateral speed of the aircraft relative to the ground must be constant, and preferably zero. The heading $\psi$ of the aircraft is then generally put into alignment with the ground track $T_{sol}$. Such a coordinated turn relative to the ground is preferably used at low speed and at low altitude, e.g. for the purpose of moving safely close to terrain in relief or buildings. This makes piloting the aircraft easier and more accurate.

Using the same reasoning as above, it is possible to determine the angular velocity in yaw $\dot\psi$ that gives a turn that is coordinated relative to the ground as follows. The projection onto a horizontal plane of the lateral speed of the aircraft relative to the ground $V_{HY}$ varies in the manner given by the following equation:

$$\dot V_{HY} = -\dot{Tk}_{sol} \cdot V_{HX} + G_{HY}$$

where $V_{HX}$ is the projection onto the same horizontal plane of the longitudinal speed of the aircraft relative to the ground $(Va_{sol})_{Long}$ and $G_{HY}$ is the projection onto the same horizontal plane of the lateral acceleration $G_y$ of the aircraft.

Choosing the rate at which the flight direction $\dot{Tk}_{sol}$ so that:

$$\dot{Tk}_{sol} = \frac{G_{HY}}{V_{HX}} + \frac{\omega_0}{V_{HX}} \cdot V_{HY}$$

leads to a first order differential equation:

$$\dot V_{HY} = -\omega_0 \cdot V_{HY}$$

that converges exponentially on 0 for $\omega_0 > 0$, with a time constant equal to the reciprocal of the coefficient $\omega_0$. Thereafter, choosing to align the heading $\psi$ of the aircraft on the ground track $T_{sol}$ also requires $\dot\psi = \dot{Tk}_{sol}$. This choice of angular velocity in yaw thus ensures that the turn is coordinated relative to the ground. By assuming:

$$\frac{G_Y}{(Va_{sol})_{Long}} \approx \frac{G_{HY}}{V_{HX}}$$

where $G_y$ is the lateral acceleration of the aircraft, $(Va_{sol})_{Long}$ is the longitudinal speed of advance relative to the ground, and approximating the term $$\frac{\omega_0}{V_{HX}} \cdot V_{HY}$$

by the term $K' \times (Va_{sol})_{Lat}$ where $(Va_{sol})_{Lat}$ is the lateral speed of advance relative to the ground and K' is another multiplier coefficient selected so as to produce a gain $$\frac{\omega_0}{V_{HX}}$$

that varies with the projection of the lateral speed of advance of the aircraft relative to ground, such that:

$$K' \times (Va_{sol})_{Lat} \approx \frac{\omega_0}{V_{HX}} \cdot V_{HY}$$

the following formula is obtained giving the angular speed in yaw $\dot\psi$ of the aircraft:

$$\dot\psi = \frac{G_Y}{(Va_{sol})_{Long}} + K' \times (Va_{sol})_{Lat}.$$

Furthermore, an autopilot can enable the aircraft to perform such turns that are coordinated relative to the ground or relative to the air, e.g. by applying one or other of these two formulas, i.e.:

$$\dot\psi = \frac{G_Y}{(Va_{sol})_{Long}} + K' \times (Va_{sol})_{Lat}$$

or else:

$$\dot\psi = \frac{G_Y}{(Va_{air})_{Long}} + K \times Ny$$

so as to determine in particular the heading $\psi$ from the angular velocity in yaw $\dot\psi$.

Nevertheless, if there is a strong wind, and in particular a strong lateral wind, making a turn that is coordinated, e.g. relative to ground, requires a large control excursion in yaw, i.e. a control of large amplitude that makes it necessary, when the strong lateral wind is acting on a side that is unfavorable for the aircraft, to provide a large amount of power from the yaw anti-torque device, such as a tail rotor. The anti-torque device must then oppose the lateral wind in order to maintain the heading $\psi$ of the aircraft which is then generally aligned on the ground track $T_{sol}$, i.e. the nose of the aircraft is aligned on the flight direction $Tk_{sol}$ of the track $T_{sol}$.

Furthermore, the transition between a turn that is coordinated relative to the ground and a turn that is coordinated relative to the air is difficult for a pilot to manage since the pilot has no accurate references. Furthermore, switching the autopilot over from one type of coordination to the other can give rise to unwanted yaw movements.

Advantageously, the method of the invention for determining an angular velocity in yaw makes it possible firstly to take account of the wind to which the aircraft is subjected in order to reduce the need for power from the anti-torque device during a coordinated turn, and secondly to put into place a transition between a ground coordinated turn and an air coordinated turn that takes place progressively.

When attempting ground coordination, it is preferable to limit the angle between the heading $\psi$ and the wind direction in order to reduce lateral exposure to the wind, with all the undesirable effects that such exposure induces such as large roll angles or large yaw control excursions, that can be as great as the limits on such controls, and a need for a high level of power under unfavorable conditions from the anti-torque device. The turn is then no longer accurately coordinated relative to the ground, with an angular difference then appearing between the nose of the aircraft and the track $T_{sol}$, but the operation of the aircraft is optimized, in particular in terms of the roll it takes on and the yaw control amplitude and the consumption of power, in particular from the anti-torque device.

The method of the invention for determining an angular velocity in turning makes it possible to determine the angular velocity $\dot\psi$ in yaw of the aircraft while taking account of the speeds of advance of the aircraft relative to the ground $V\alpha_{sol}$ and relative to the air $V\alpha_{air}$. It is then possible to deduce which angular velocity $\dot\psi$ needs to be applied to the heading $\psi$ of the aircraft in order to enable it to fly in a straight line as when turning with a compromise between drift, i.e. angle between the flight direction $T_{sol}$ and the heading $\psi$, and roll angle, or between drift and yaw control excursion and power consumed by the aircraft, in particular by the anti-torque device. It is preferable to give consideration to the compromise that is the most constraining in terms of power consumed by the aircraft.

For this purpose, the method of the invention makes it possible to compare firstly the longitudinal speed of advance of the aircraft relative to the ground and relative to the air, and secondly the lateral speed of advance of the aircraft relative to the ground and relative to the air, while taking account of margins that are a function of the speed of advance of the aircraft relative to the air, and then to deduce an angular velocity $\dot\psi$ of the aircraft therefrom.

In the invention, the angular velocity in yaw $\dot\psi$ for application to the aircraft, e.g. by an autopilot, for the purpose of following a track $T_{sol}$ during a turn may be broken down into an anticipation value A and a correction value B such that:

$$\dot\psi = A + B.$$

The anticipation value A of the angular velocity in yaw $\dot\psi$ is determined from the conventional formula for determining an angular velocity during a coordinated turn, i.e. such that:

$$A = \frac{G_Y}{V_{Long}}$$

where $V_{Long}$ is the longitudinal speed of the aircraft.

In the context of ground coordination, this longitudinal speed $V_{Long}$ is the longitudinal speed of advance of the aircraft relative to the ground $(V\alpha_{sol})_{Long}$, whereas in the context of air coordination, it is equal to the longitudinal speed of advance of the aircraft relative to the air $(V\alpha_{air})_{Long}$.

In order to take account of a transition between ground coordination and air coordination, the longitudinal speed $V_{Long}$ is equal to the longitudinal speed of advance relative to the ground $(V\alpha_{sol})_{Long}$ so long as the longitudinal speed of advance relative to the ground $(V\alpha_{sol})_{Long}$ lies strictly within the first interval Int1. In contrast, the longitudinal speed $V_{Long}$ is equal to the low first boundary of this interval Int1 when the longitudinal speed of advance relative to the ground $(V\alpha_{sol})_{Long}$ is less than or equal to the low first boundary and the longitudinal speed $V_{Long}$ is equal to the high first boundary of the first interval Int1 when this longitudinal speed of advance relative to the ground $(V\alpha_{sol})_{Long}$ is greater than or equal to the high first boundary.

Furthermore, in order to ensure a transition that is progressive between ground coordination and air coordination, the margin Offset is variable as a function of the speed of advance of the aircraft relative to the air $V\alpha_{air}$. Furthermore, this margin Offset decreases when the speed of advance of the aircraft relative to the air $V\alpha_{air}$ increases.

The longitudinal speed $V_{Long}$ taken into account for calculating the anticipation value A is bounded by the first interval Int1, thereby having the effect of limiting variations therein. Furthermore, since the first interval Int1 is centered on the longitudinal speed of advance of the aircraft relative to the air $(V\alpha_{air})_{Long}$, the longitudinal speed $V_{Long}$ varies between the longitudinal speed of advance of the aircraft relative to the ground $(V\alpha_{sol})_{Long}$ and a value close to the speed of advance of the aircraft relative to the air $(V\alpha_{air})_{Long}$, thereby ensuring that the transition between ground coordination and air coordination is progressive.

Advantageously, comparing the longitudinal speeds of advance of the aircraft relative to the ground $(V\alpha_{sol})_{Long}$ and relative to the air $(V\alpha_{air})_{Long}$ also makes it possible to take account of the longitudinal wind to which the aircraft is being subjected when determining the angular velocity in yaw $\dot\psi$.

For example, this margin Offset is constant for a speed of advance of the aircraft relative to the air $V\alpha_{air}$ less than or equal to 20 kt, and this margin Offset is equal to 20 kt. For a speed of advance of the aircraft relative to the air $V\alpha_{air}$ lying in the range 20 kt to 70 kt, this margin Offset decreases and becomes zero for a speed of advance of the aircraft relative to the air $V\alpha_{air}$ that is greater than or equal to 70 kt.

Thus, as from a speed of advance of the aircraft relative to the air $V\alpha_{air}$ equal to 70 kt, the margin Offset is zero. The first interval Int1 is then reduced to only one value, namely the speed of advance of the aircraft relative to the air $V\alpha_{air}$. As a result, the longitudinal speed $V_{Long}$ is equal to the longitudinal speed of advance of the aircraft relative to the air $(V\alpha_{air})_{Long}$. The anticipation value A then corresponds to air coordination, which is consistent with the high speed of advance of the aircraft.

In contrast, for a speed of advance of the aircraft relative to the air $V\alpha_{air}$ that is less than or equal to 20 kt, the first boundaries of the first interval Int1 are 0 and 40 kt. So long as the speed of advance of the aircraft relative to the ground $V\alpha_{sol}$ lies in the first interval Int1, the longitudinal speed $V_{Long}$ is equal to the longitudinal speed of advance of the aircraft relative to the ground $(V\alpha_{sol})_{Long}$. The anticipation value then corresponds to ground coordination, which is consistent with the low speed of advance of the aircraft.

Finally, for a speed of advance of the aircraft relative to the air $V\alpha_{air}$ lying in the range 20 kt to 70 kt, the margin Offset varies and serves to provide a progressive transition between ground coordination and air coordination. Specifically, since the longitudinal speed $V_{Long}$ taken into account for calculating the anticipation value A is bounded by the first interval Int1 centered on the speed of advance of the aircraft relative to the air $V\alpha_{air}$, this longitudinal speed $V_{Long}$ varies progressively and without any sudden variation. Furthermore, since the margin Offset decreases as the speed of advance of the aircraft relative to the air $V\alpha_{air}$ increases, the width $D_{int1}$ of the first interval Int1 tends to reduce as the speed of advance of the aircraft relative to the air $V\alpha_{air}$ increases.

Consequently, when the speed of advance of the aircraft relative to the air $V\alpha_{air}$ increases during a turn, the longitudinal speed $V_{Long}$ taken into account for calculating the anticipation value A varies progressively from the speed of advance of the aircraft relative to the ground $V\alpha_{sol}$ up to the speed of advance of the aircraft relative to the air $V\alpha_{air}$. The margin Offset preferably varies in linear manner down to a value zero over this range of speeds extending from 20 kt to 70 kt.

The correction value B of the angular velocity in yaw $\dot{\psi}$ may be determined from one or the other of two formulas for determining a coordinated angular velocity in turning, i.e. such that $B=K_1 \times Ny$ for air coordination and $B=K_2 \times (V\alpha_{sol})_{Lat}$ for ground coordination.

Furthermore, in the context of a coordinated turn, whether relative to the ground or to air, it is desired to limit or even eliminate the lateral speed of the aircraft relative to the ground $(V\alpha_{sol})_{Lat}$ insofar as the lateral load factor Ny is not too great, where the lateral load factor Ny reveals the presence of a lateral speed of the aircraft relative to the air $(V\alpha_{air})_{Lat}$.

In order firstly to limit this lateral load factor Ny to an acceptable value, and consequently also to limit the lateral speed of the aircraft, and secondly also to take account of a transition between ground coordination and air coordination, the method of the invention for determining an angular velocity in turning makes it possible to introduce a limit for the lateral speed of the aircraft relative to the ground $(V\alpha_{sol})_{Lat}$ that is taken into account when determining the angular velocity in yaw $\dot{\psi}$. This limit is a function in particular of the lateral load factor Ny, and may for example lie in the range [−0.1 G, +0.1 G], where G is the acceleration due to terrestrial gravity.

As a result, the correction value B for the angular velocity in yaw $\dot{\psi}$ is then determined in the invention using a formula such that:

$$B=K_2 \times V\alpha_{Lat}$$

there being a relationship between the lateral speed of advance of relative to the air $(V\alpha_{air})_{Lat}$ and the load factor Ny such that:

$$(V\alpha_{air})_{Lat}=K_1 \times Ny$$

where $K_1$ and $K_2$ are first and second multiplier coefficients. These multiplier coefficients are determined from the above-mentioned first order equations and from the associated variable gains.

This lateral speed $V_{Lat}$ is equal to the lateral speed of advance of the aircraft relative to the ground $(V\alpha_{sol})_{Lat}$, but it is limited to a second interval Int2. The second interval Int2 has a width $D_{int2}$ that is equal to the sum of the low margin Offset$_{Lo}$ plus the high margin Offset$_{Hi}$, such that:

$$D_{int2}=Offset_{Lo}+Offset_{Hi}$$

The low and high margins Offset$_{Lo}$ and Offset$_{Hi}$ are generally different in order to take account of the effects of rotation of the main rotor of the aircraft and more particularly of the yaw torque that it generates on the fuselage of the aircraft.

Consequently, the lateral speed $V_{Lat}$ is equal to the lateral speed of advance relative to the ground $(V\alpha_{sol})_{Lat}$ so long as the lateral speed of advance relative to the ground $(V\alpha_{sol})_{Lat}$ lies strictly within the second interval Int2. In contrast, the lateral speed $V_{Lat}$ is equal to the low second boundary of this second interval Int2 when the lateral speed of advance relative to the ground $(V\alpha_{sol})_{Lat}$ is less than or equal to the low second boundary, and the lateral speed $V_{Lat}$ is equal to the high second boundary of the second interval Int2 when the lateral speed of advance relative to the ground $(V\alpha_{sol})_{Lat}$ is greater than or equal to the high second boundary.

In order to ensure a transition that is progressive between ground coordination and air coordination, the low margin Offset$_{Lo}$ and the high margin Offset$_{Hi}$ are variable as a function of the speed of advance of the aircraft relative to the air $V\alpha_{air}$. Furthermore, the low margin Offset$_{Lo}$ and high margin Offset$_{Hi}$ decrease with increasing speed of advance of the aircraft relative to the air $V\alpha_{air}$, thus progressively bringing the aircraft towards air coordination.

By way of example, the high margin Offset$_{Hi}$ and the low margin Offset$_{Lo}$ are equal respectively to +20 kt and −20 kt when the speed of advance of the aircraft relative to the air $V\alpha_{ai}$ is less than 20 kt, whereas the high margin Offset$_{Hi}$ and the low margin Offset$_{Lo}$ are zero when the speed of advance of the aircraft relative to the air $V\alpha_{air}$ is greater than or equal to 70 kt.

The lateral speed $V_{Lat}$ taken into account for calculating the correction value B is bounded by the second interval Int2, thereby having the effect of limiting variations therein. Furthermore, the low and high second boundaries of the second interval Int2 are situated on either side of the first product of the first multiplier coefficient $K_1$ multiplied by the lateral load factor Ny: the lateral speed $V_{Lat}$ thus varies between the speed of advance of the aircraft relative to the ground $(V\alpha_{sol})_{Lat}$ and the second boundaries of the second interval Int2 thus ensure a transition that is progressive between ground coordination and air coordination.

Advantageously, the comparison between the lateral speed of advance of the aircraft relative to the ground $(V\alpha_{sol})_{Lat}$ and the second boundaries of the second interval Int2 also makes it possible to take account of the lateral wind to which the aircraft is subjected when determining the angular velocity in yaw $\dot{\psi}$.

The angular velocity in yaw $\dot{\psi}$ of the aircraft is then determined by the sum of the anticipation value A plus the correction value B, such that:

$$\dot{\psi}=A+B.$$

It is then possible to deduce the heading $\psi$ for application to the aircraft by integrating this angular velocity in yaw $\dot{\psi}$ relative to time. This yaw angle $\psi$ is used as a flight setpoint for the autopilot in order to follow the track $T_{sol}$ while obtaining a compromise between coordinating the turn and making use of the power of the aircraft as a function of wind conditions.

In addition, the lateral load factor Ny of the aircraft that is used for determining the correction value B of the angular velocity in yaw $\dot{\psi}$ may be compensated in order to take account of the lateral load factor of the aircraft when hovering without wind.

Furthermore, the pilot of the aircraft may modify the heading $\psi$ of the aircraft during a turn, e.g. for the purpose of improving outside visibility or indeed improving the comfort of the occupants of the aircraft, while nevertheless conserving the same flight track $T_{sol}$ relative to the ground. Such a modification to the heading $\psi$ may be performed manually and transparently by means of pedals or else by means of a dedicated control member such as a "beep".

The flight direction of the aircraft thus remains unchanged even though the heading $\psi$ has been modified. As a result, coordination of the turn of the aircraft is no longer ensured. Furthermore, the exposure of the aircraft to wind is also modified.

The method of the invention for determining an angular velocity in turning thus serves to manage priority between firstly the pilot requesting a change of heading $\psi$ and secondly the need to return to the turn being coordinated with account being taken of wind.

Such a modification to the heading $\psi$ is advantageous essentially at low speed, in particular to enable the pilot to improve visibility of the outside environment, e.g. in order to fly at low altitude close to buildings and terrain in relief. The method of the invention for determining an angular velocity in turning thus makes it possible to conserve the heading $\psi$ as modified by the pilot for low speeds of advance $V\alpha_{air}$ relative to the air, i.e. for speeds of advance relative to the air $V\alpha_{air}$ that are less than or equal to a threshold speed $V_{thresh}$.

Thus, for speeds of advance relative to the air $V_{air}$ greater than the threshold speed $V_{thresh}$, coordination turning is provided by the method of the invention for determining an angular velocity in turning after the pilot has modified the heading $\psi$. The method determines the angular velocity in yaw $\dot{\psi}$ from which the heading $\psi$ for application to the aircraft is deduced by means of the autopilot.

Furthermore, this threshold speed $V_{thresh}$ may be variable in order to take account of the wind to which the aircraft is being subjected, in particular at a low speed of advance relative to the ground. This threshold speed $V_{thresh}$ is preferably constant for a longitudinal speed $V_{Long}$ of the aircraft that is greater than or equal to 30 kt, and increases with decreasing longitudinal speed $V_{Long}$ down to 15 kt, and is once more constant for a longitudinal speed $V_{Long}$ that is less than 15 kt. Thus, this threshold speed $V_{thresh}$ makes it possible to guarantee a minimum range of speeds of advance relative to the ground in which the heading $\psi$ is conserved.

For example, the threshold speed $V_{thresh}$ is a threshold with hysteresis having limits of 60 kt and 70 kt for a longitudinal speed $V_{Long}$ of the aircraft less than or equal to 30 kt and having limits of 80 kt and 90 kt for a longitudinal speed $V_{Long}$ less than 15 kt.

Furthermore, such a modification of the heading $\psi$ is followed by a roll action of the pilot modifying the course angle $Tk_{sol}$ and consequently the track $T_{sol}$ followed by the aircraft, the method of the invention for determining an angular velocity in turning making it possible to take account of two different situations. Such an action in roll by the pilot may be performed transparently by means of a control stick or lever for controlling the lateral cyclic pitch or else by means of a dedicated control member such as a "beep".

Firstly, if the pilot applies only a small correction to the track $T_{sol}$, the heading $\psi$ is corrected so as to conserve substantially unchanged difference between the course angle $Tk_{sol}$ and the heading $\psi$ as previously modified by the pilot. It is considered that a small correction to the track $T_{sol}$ corresponds to a modification to the course angle $Tk_{sol}$ that is less than or equal to a threshold angle. For example, the threshold angle is equal to 10°.

Thereafter, if the pilot modifies the track $T_{sol}$ to a greater extent, i.e. so that the modification to the course angle $Tk_{sol}$ is greater than the threshold angle, the wind exposure of the aircraft is consequently also modified in significant manner. The heading $\psi$ as modified by the pilot action is then no longer of interest relative to the new track $T_{sol}$ followed by the aircraft. The modified heading $\psi$ may be abandoned so as to be able to return to coordinating the turn with the new track $T_{sol}$ being used by the method of the invention for determining an angular velocity in turning. The heading $\psi$ is then deduced from the angular velocity in yaw $\dot{\psi}$ as determined from the anticipation value A and the correction value B by the method of the invention for determining an angular velocity in turning.

The present invention also provides a system for determining an angular velocity in turning for a rotary wing aircraft, the system for determining an angular velocity in turning comprising at least two components and a memory, the first component being dedicated, for example, to calculating the anticipation value A for the angular velocity in yaw $\dot{\psi}$, and the second component being dedicated to calculating the correction value B for said angular velocity in yaw $\dot{\psi}$. The memory may serve in particular to conserve the values used by the components, e.g. the multiplier coefficients $K_1$ and $K_2$, the modified heading $\psi$, and also the results, e.g. the anticipation value A and the correction value B for the angular velocity in yaw $\dot{\psi}$.

The aircraft is characterized by three preferred directions, a longitudinal direction X extending from the front of the aircraft to the rear of the aircraft, a direction in elevation Z extending upwards perpendicularly to the longitudinal direction X, and a transverse direction Y extending from right to left perpendicularly to the longitudinal and elevation directions X and Z. The longitudinal direction X is the roll axis of the aircraft, the transverse direction Y is the pitching axis, and the direction in elevation Z is the yaw axis.

The aircraft has at least one rotary wing, comprising a plurality of main blades of collective pitch and cyclic pitch that are variable about respective pitch axes, enabling the aircraft to perform movements in rotation about these directions X, Y, and Z, and in translation along these directions X, Y, and Z.

The rotary wing aircraft is also provided with at least one control means and with an autopilot for generating control signals in predefined modes of operation and in application of flight setpoints. The control signals from the pilot or from the autopilot can cause the aircraft move in rotation and/or translation relative to the directions X, Y, and Z.

In the description below, in a component, it is considered that a first element is positioned upstream from a second element when they are connected together by a connection that may be wired or wireless. At least one output from the first element is connected in parallel to an input of the second element. The second element is then positioned downstream from the first element.

The first component comprises a first limiter, a first subtracter, a first adder, and a divider. The first subtracter and the first adder are positioned upstream from the first limiter, respectively upstream from minimum and maximum first inputs Min1 and Max1 of the first limiter. The first subtracter receives as input the longitudinal speed of advance relative to the air $(V\alpha_{air})_{Long}$ and the margin Offset, and outputs a first subtraction between the longitudinal speed of advance relative to the air $(V\alpha_{air})_{Long}$ minus the margin Offset. The first adder receives as input this longitudinal speed of advance relative to the air $(V\alpha_{air})_{Long}$ and the margin Offset and outputs a first addition between the longitudinal speed of advance relative to the air $(V\alpha_{air})_{Long}$ and the margin Offset.

The first limiter receives as its main input the longitudinal speed of advance relative to the ground $(V\alpha_{sol})_{Long}$ and as minimum and maximum first inputs Min1 and Max1 the first subtraction and the first addition respectively. The minimum and maximum first inputs Min1 and Max1 constitute respectively the low and high first boundaries of the first interval Int1. This first limiter outputs the longitudinal speed $V_{Long}$ that is equal to the longitudinal speed of advance relative to the ground $(V\alpha_{sol})_{Long}$ limited by the minimum and maximum first inputs Min1 and Max1 when the longitudinal speed of advance relative to the ground $(V\alpha_{sol})_{Long}$ is respectively less than or greater than the minimum and maximum first inputs Min1 and Max1.

The divider is positioned downstream from the first limiter and receives as its numerator input the lateral acceleration $G_y$ of the aircraft set by the pilot of the aircraft and as its denominator input the longitudinal speed $V_{Long}$. The divider outputs the lateral acceleration $G_y$ divided by the longitudinal speed $V_{Long}$ corresponding to the anticipation value A of the angular velocity $\dot{\psi}$ in yaw to be applied to the aircraft.

The second component comprises a second limiter, a second subtracter, a second adder, and two multipliers. A first multiplier is positioned upstream from the second subtracter and the second adder. This first multiplier receives as input both the first multiplier coefficient $K_1$ and the lateral load factor Ny and it delivers as output a first product of the first multiplier coefficient $K_1$ multiplied by the first lateral load factor Ny.

The second subtracter and the second adder are positioned upstream from the second limiter, respectively upstream from a minimum second input Min2 and a maximum second input Max2 of the second limiter. This second subtracter receives as input this first product and the low margin $Offset_{Lo}$ and outputs a second subtraction of the first product minus the low margin $Offset_{Lo}$. The second adder receives as input the first product and the high margin $Offset_{Hi}$, and outputs a second addition of the first product plus the high margin $Offset_{Hi}$.

The second limiter receives as its main input the lateral speed of advance relative to the ground $(V\alpha_{sol})_{Lat}$ and as minimum and maximum second inputs Min2 and Max2 respectively the second subtraction and the second addition. The minimum and maximum second inputs Min2 and Max2 constitute respectively the low second boundary and the high second boundary of the second interval Int2. The second limiter outputs the lateral speed $V_{Lat}$, which is equal to the lateral speed of advance relative to the ground $(V\alpha_{sol})_{Lat}$ limited by the minimum and maximum second inputs Min2 and Max2 when the lateral speed of advance relative to the ground $(V\alpha_{sol})_{Lat}$ is respectively less than or greater than the minimum and maximum second inputs Min2 and Max2.

A second multiplier is positioned downstream from the second limiter and receives as input the lateral speed $V_{Lat}$ and the second multiplier coefficient $K_2$, and outputs a second product of the lateral speed $V_{Lat}$ multiplied by the second multiplier coefficient $K_2$ corresponding to the correction value B for the angular velocity $\dot{\psi}$ in yaw for application to the aircraft.

In a variant of this system for determining an angular velocity in turning, the first and second components could be combined to form a single calculation unit.

In addition, the second component may include a compensator positioned before the first multiplier in order to take account of the lateral load factor of the aircraft in hovering flight.

Furthermore, the heading $\psi$ for application to the aircraft while making a turn may be determined from the angular velocity in yaw $\dot{\psi}$ by a third component, e.g. present in the system for determining an angular velocity in turning.

The system for determining an angular velocity in turning can thus perform the above-described method of determining an angular velocity in turning.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

Elements present in more than one of the figures are given the same references in each of them.

DETAILED DESCRIPTION OF THE INVENTION

Figure 1:
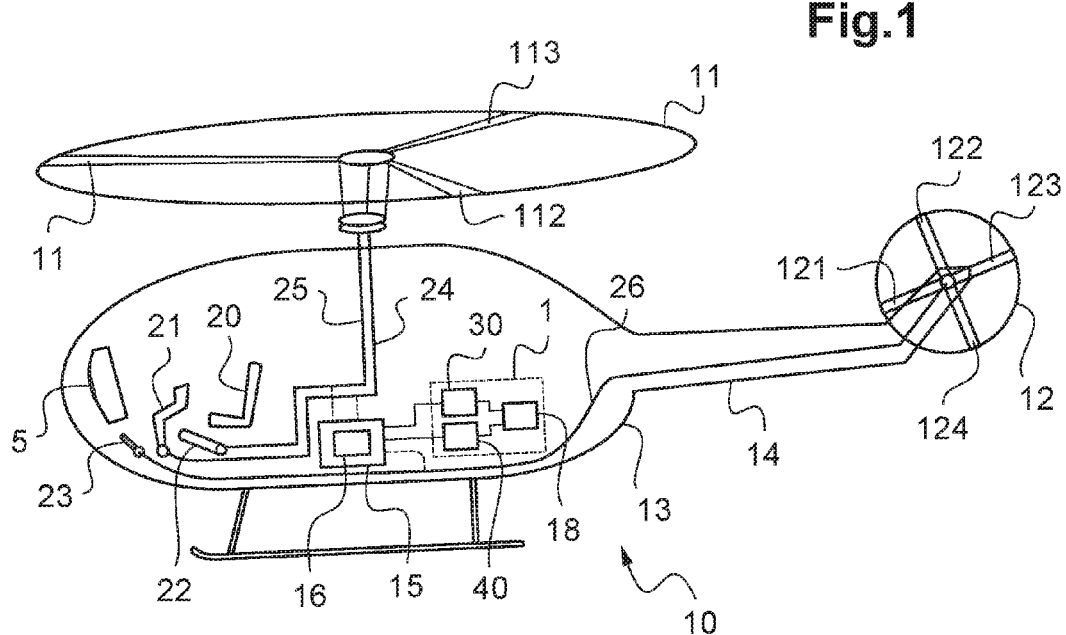
FIG. 1 shows an aircraft having a system of the invention for determining angular velocity in turning.

In FIG. 1 there can be seen an aircraft 10 that has a main rotor 11 positioned above a fuselage 13 and an anti-torque device 12 such as a tail rotor positioned at the tail end of a tail boom 14. The aircraft 10 also has an instrument panel 5, a seat 20 on which the pilot of the aircraft 10 can sit, an autopilot 15, a system 1 for determining an angular velocity in turning, and manual control means, made up in particular of two levers or control sticks 21, 22 and pedals 23. The system 1 for determining an angular velocity in turning comprises first and second components 30 and 40, together with a memory 18.

Furthermore, an X, Y, Z reference frame is attached to the aircraft 10, and more particularly to its center of gravity. The longitudinal direction X extends from the front of the aircraft to the rear of the aircraft 10, the elevation direction Z extends upwards perpendicularly to the longitudinal direction X, and the transverse direction Y extends from right to left perpendicularly to the longitudinal and elevation directions X and Z.

The longitudinal direction X is the roll axis of the aircraft 10, the transverse direction Y is its pitching axis, and the elevation direction Z is its yaw axis.

The main rotor 11 has an axis of rotation that is substantially vertical, i.e. parallel to the elevation direction Z, and it is provided with three main blades 111, 112, 113 having collective pitch and cyclic pitch that are variable under the control of the control levers 21, 22 and of the autopilot 15. In similar manner, the tail rotor 12 has its axis of rotation substantially horizontal, i.e. parallel to the transverse direction Y, and it is provided with four secondary blades 121, 122, 123, 124 of collective pitch that is variable and controllable by means of the pedals 23 and of the autopilot 15.

More precisely, the first control lever 21 controls the cyclic pitch of the main blades 111, 112, 113 by means of a first control linkage 24. The second control lever 22 controls the collective pitch of the main blades 111, 112, 113 by means of a second control linkage 25. Taking action on the first control lever 21 then serves to control movements in rotation of the aircraft 10 about the longitudinal and transverse directions X and Y, and taking action on the second control lever then serves to control movements in translation of the aircraft 10 along the elevation direction Z.

Likewise, the pedals 23 control the collective pitch of the secondary blades 121, 122, 123, 124 via a third control linkage 26. Taking action on the pedals 23 then serves to control movements in rotation of the aircraft 10 about its yaw axis.

The control linkages 24, 25, 26 serve to actuate the various blades and may for example be made up of connections that are entirely mechanical between the manual control means 21, 22, 23 and the blades. These control linkages 24, 25, 26 may also be made up of mechanical connections associated with hydraulic actuator means, or indeed electrical connections associated with such hydraulic actuator means.

The autopilot 15 also serves to control the collective and cyclic pitches of the main blades 111, 112, 113, and also the collective pitch of the secondary blades 121, 122, 123, 124 by acting respectively on the same control linkages 24, 25, 26. The autopilot 15 then serves to control movements in rotation of the aircraft 10 about the longitudinal and transverse directions X and Y and movements in translation of the aircraft 10 along the elevation direction Z, and also movements in rotation of the aircraft 10 about its yaw axis.

The aircraft 10 can fly along a track $T_{sol}$ relative to the ground, this track $T_{sol}$ being determined relative to the ground and defined in a terrestrial geographical reference frame, e.g. determined by the cardinal points and the direction of terrestrial gravity.

A flight of an aircraft 10 along this track $T_{sol}$ may particularly be characterized by a ground course angle $Tk_{sol}$ between the direction of the track $T_{sol}$ and the direction of north in a horizontal plane of the terrestrial geographical reference frame, a speed of advance $V\alpha$ of the aircraft 10, a flight path angle P formed by the angle between the direction of the track $T_{sol}$ 10 and the horizontal orientation of the terrestrial reference frame, and a heading $\psi$ which is the angle formed between the direction of north and the projection of the longitudinal direction X of the aircraft 10 onto a horizontal plane of the terrestrial reference frame.

The speed of advance $V\alpha$ of the aircraft 10 is the speed of the aircraft 10 along the direction of the track $T_{sol}$, and this speed may be defined relative to the ground or else relative to the air.

Figure 2:
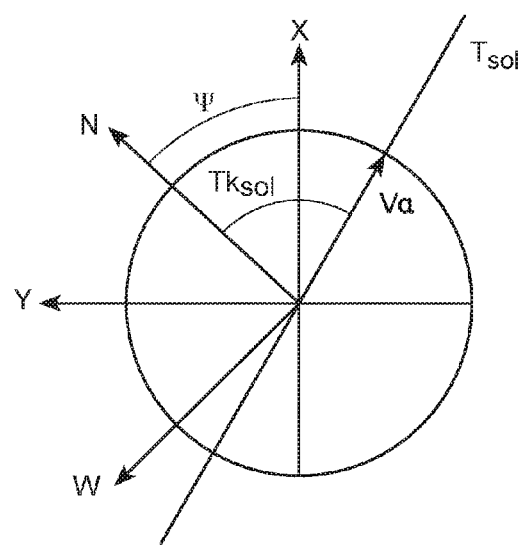
FIG. 2 is a diagram showing the ground course angle and the heading of the aircraft.

FIG. 2 shows a projection onto a horizontal plane of the terrestrial reference frame of a track $T_{sol}$. The longitudinal and transverse directions X, Y of the aircraft 10 are also shown as are the directions N, W of a terrestrial geographical reference frame.

The heading $\psi$ is thus shown between the longitudinal direction X of the aircraft 10 and the direction N of north. The course angle $Tk_{sol}$ on the ground is shown between the direction of the track $T_{sol}$ and the direction N of north.

It can be seen that the heading $\psi$ is different from the ground course angle $Tk_{sol}$. Consequently, the nose and the tail boom 14 of the aircraft 10, which are in alignment on the longitudinal direction X, are not in alignment with the track $T_{sol}$. Likewise, the speed of advance $V\alpha$ is in alignment with the track $T_{sol}$ and is not parallel to the longitudinal direction X.

Nevertheless, depending on the flight conditions of the aircraft 10 and in particular on its speed of advance $V\alpha$, the aircraft 10 may be caused to turn in various ways. When the aircraft 10 is flying at a low speed of advance $V\alpha$, it is preferable to coordinate a turn of the aircraft 10 relative to the ground so as to give preference to following a track relative to the ground, e.g. so as to be able to move at low altitude in the proximity of buildings and of terrain in relief.

In contrast, when the aircraft 10 is flying at a faster speed of advance $V\alpha$, while in cruising flight, a turn of the aircraft 10 is preferably coordinated relative to the air in order to give preference to the comfort of the occupants of the aircraft 10.

The system 1 for determining an angular velocity in turning of the aircraft 10 may make use of a method of determining an angular velocity in turning in order firstly to perform turns that are coordinated relative to the ground or else relative to the air, and secondly to manage the transition between ground coordination and air coordination, while taking account of the wind to which the aircraft 10 is subjected.

Making turns that are coordinated relative to the ground without taking account of the wind to which the aircraft 10 is subjected may, in the event of a strong side wind, make it necessary to maintain a high roll angle and a large control excursion in yaw, corresponding, when the side wind is acting from a side that is unfavorable on the aircraft, to the anti-torque device 12 of the aircraft 10 delivering considerable power in order to oppose the side wind. It is nevertheless possible to optimize the operation of the aircraft 10, in particular in terms of its roll angle and of its power consumption, specifically the power consumption of the anti-torque device 12, by modifying the heading $\psi$ of the aircraft 10. Unfortunately, under such circumstances, the turn is not properly coordinated. A compromise must therefore be found between making a coordinated turn, the aircraft taking on a roll angle, the setting of the pitch of the anti-torque device 12, and/or the power consumed by the anti-torque device 12.

The method of the invention for determining an angular velocity in turning enables the angular velocity $\dot{\psi}$ of the aircraft 10 to be determined while taking account of the speeds of advance of the aircraft 10 relative to the ground $V\alpha_{sol}$ and relative to the air $V\alpha_{air}$, the lateral acceleration $G_y$ and the lateral load factor Ny. It is then possible merely by integrating the angular velocity $\dot{\psi}$ to deduce the heading $\psi$ to be applied to the aircraft 10, e.g. by using the autopilot 15.

Figure 3:
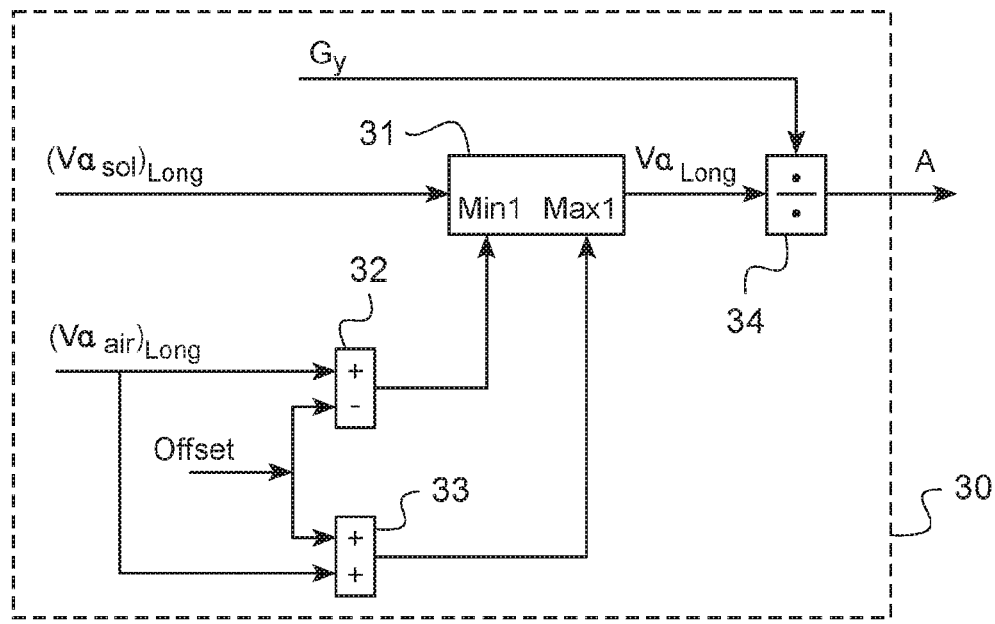
FIGS. 3 and 4 are two detail views of first and second components of the system for determining an angular velocity in turning.
Figure 4:
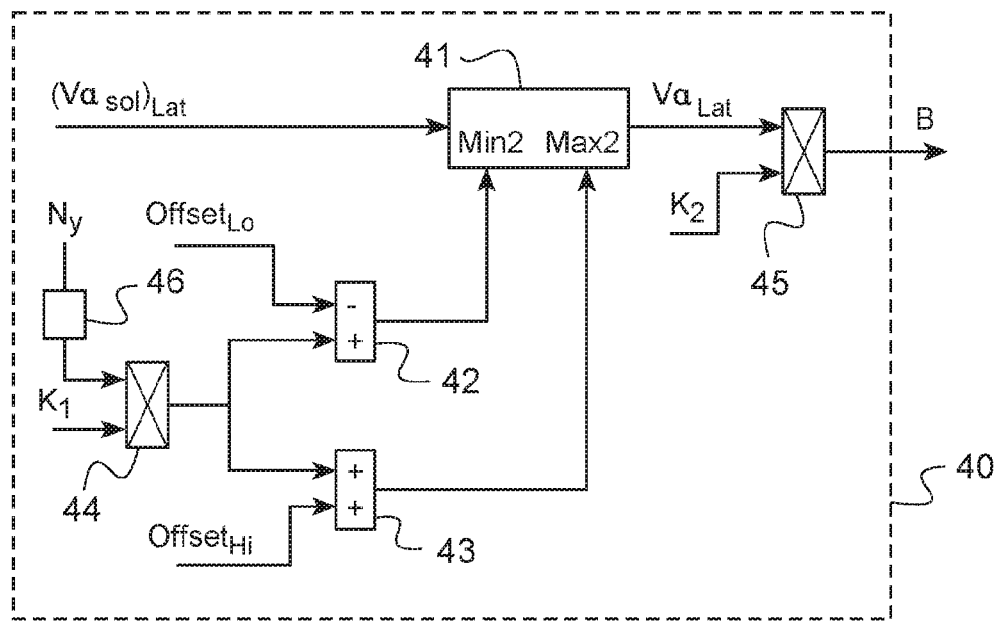

FIGS. 3 and 4 show respectively the first component 30 and the second component 40 of the system 1 of the invention for determining an angular velocity in turning.

The first component 30 serves to calculate an anticipation value A for this angular velocity in yaw $\dot{\psi}$, while the second component 40 serves to calculate a correction value B for correcting this angular velocity in yaw $\dot{\psi}$, such that:

$$\dot{\psi} = A + B.$$

The memory 18 serves in particular to conserve the values used by these components 30 and 40 and the results of their calculations.

The first component 30 shown in FIG. 3 includes a first limiter 31, a first subtracter 32, a first adder 33, and a divider 34. The first subtracter 32 and the first adder 33 are positioned upstream from the first limiter 31, respectively upstream from the minimum and maximum first inputs Min1 and Max1 of the first limiter 31. The minimum and maximum first inputs Min1 and Max1 thus form low and high first boundaries of a first interval Int1 of width $D_{int1}$. The divider 34 is positioned downstream from the first limiter 31.

The first subtracter 32 and the first adder 33 receive as input the longitudinal speed of advance relative to the air $(V\alpha_{air})_{Long}$ and the margin Offset and then deliver respective outputs comprising first and second subtractions between this longitudinal speed of advance relative to the air $(V\alpha_{air})_{Long}$ and the margin Offset.

The first limiter 31 receives as its main input the longitudinal speed of advance relative to the ground $(V\alpha_{sol})_{Long}$, and as its minimum and maximum first inputs Min1 and Max1 respectively the first subtraction and the first addition. These minimum and maximum first inputs Min1 and Max1 are then respectively $$Min1 = (Va_{air})_{Long} - \frac{D_{int1}}{2}$$

and $$Max1 = (Va_{air})_{Long} + \frac{D_{int1}}{2}$$

with the margin Offset being given by $$\text{Offset} = \frac{D_{int1}}{2}$$

The first limiter 31 outputs a longitudinal speed $V_{Long}$ that is equal to the longitudinal speed of advance relative to the ground $(V\alpha_{sol})_{Long}$, such that:

$$Va_{Long} = (V\alpha_{sol})_{Long}$$

when the longitudinal speed of advance relative to the ground $(V\alpha_{sol})_{Long}$ lies strictly between the minimum and maximum first inputs Min1 and Max1. In contrast, this first limiter 31 outputs a longitudinal speed $V_{Long}$ that is equal to the minimum first input Min1 such that:

$$Va_{Long} = (Va_{air})_{Long} - \frac{D_{int1}}{2}$$

when said longitudinal speed of advance relative to the ground $(V\alpha_{sol})_{Long}$ is less than or equal to the minimum first input Min1, while said longitudinal speed $V_{Long}$ is equal to the maximum first input Max1, such that:

$$Va_{Long} = (Va_{air})_{Long} + \frac{D_{int1}}{2}$$

when this longitudinal speed of advance relative to the ground $(V\alpha_{sol})_{Long}$ is greater than or equal to the maximum first input Max1.

Finally, the divider 34 receives as input both a numerator constituted by the lateral acceleration $G_y$ of the aircraft 10 as set by a pilot of the aircraft 10 and a denominator constituted by the longitudinal speed $V_{Long}$. The divider 34 outputs the lateral acceleration $G_y$ divided by the longitudinal speed $V_{Long}$ corresponding to the anticipation value A for the angular velocity $\dot{\psi}$ in yaw that is to be applied to the aircraft 10, such that:

$$A = \frac{G_Y}{Va_{Long}}$$

The second component 40 shown in FIG. 4 comprises a second limiter 41, a second subtracter 42, a second adder 43, and two multipliers 44 and 45. A first multiplier 44 is positioned upstream from the second subtracter 42 and from the second adder 43. The second subtracter 42 and the second adder 43 are positioned upstream from the second limiter 41, respectively upstream from a minimum second input Min2 and a maximum second input Max2 of the second limiter 41. The minimum and maximum second inputs Min2 and Max2 thus form the low and high second boundaries of a second interval Int2 of width $D_{int2}$. A second multiplier 45 is positioned downstream from the second limiter 41.

The first multiplier 44 receives as input the first multiplication coefficient $K_1$ and the lateral load factor Ny and its outputs a first product $K_1 \times Ny$ of the first multiplier coefficient $K_1$ multiplied by the lateral load factor Ny. The second subtracter 42 receives as input this first product $K_1 \times Ny$ minus the low margin Offset$_{Lo}$ and outputs a second subtraction of the first product $K_1 \times Ny$ minus the low margin Offset$_{Lo}$. The second adder 43 receives as input this first product $K_1 \times Ny$ and the high margin Offset$_{Hi}$ and then outputs a second addition of the first product $K_1 \times Ny$ plus the high margin Offset$_{Hi}$.

The second limiter 41 receives as its main input the lateral speed of advance relative to the ground $(V\alpha_{sol})_{Lat}$ and as minimum and maximum second inputs Min2 and Max2 respectively the second subtraction and the second addition. The minimum and maximum second inputs Min2 and Max2 are then respectively:

$$Min2 = K_1 \times Ny - \text{Offset}_{Lo}$$

and $$Max2 = K_1 \times Ny + \text{Offset}_{Hi}$$

the second interval Int2 having a width $D_{int2}$ such that:

$$D_{int2} = \text{Offset}_{Lo} + \text{Offset}_{Hi}$$

The second limiter 41 outputs the lateral sped $V_{Lat}$ which is equal to the lateral speed of advance relative to the ground $(V\alpha_{sol})_{Lat}$ such that $V_{Lat} = (V\alpha_{sol})_{Lat}$ when the longitudinal speed of advance relative to the ground $(V\alpha_{sol})_{Long}$ lies strictly between the minimum and maximum second inputs Min2 and Max2. In contrast, the second limiter 41 outputs a lateral speed of advance $(V\alpha_{sol})_{Lat}$ that is equal to the minimum second input Min2 such that:

$$Va_{Lat} = K_1 \times Ny - \text{Offset}_{Lo}$$

when the lateral speed of advance relative to the ground $(V\alpha_{sol})_{Lat}$ is less than or equal to the minimum second input Min2 while the lateral speed $V_{Lat}$ is equal to the maximum second input Max2, such that:

$$Va_{Lat} = K_1 \times Ny + \text{Offset}_{Hi}$$

when the lateral speed of advance relative to the ground $(V\alpha_{sol})_{Lat}$ is greater than or equal to the maximum second input Max2.

A second multiplier 45 receives as input the lateral speed $V_{Lat}$ and the second multiplier coefficient $K_2$ and then outputs a second product of the lateral speed $V_{Lat}$ multiplied by the second multiplier coefficient $K_2$ corresponding to the correction value B for the angular velocity $\dot{\psi}$ in yaw to be applied to the aircraft 10, such that:

$$B = K_2 \times Va_{Lat}$$

The angular velocity in yaw $\dot{\psi}$ is thus the sum of the anticipation value A and the correction value B such that:

$$\dot{\psi} = A + B$$

and more precisely such that:

$$\dot{\psi} = \frac{G_Y}{V_{long}} + K_2 \times V_{Lat}.$$

As a result, the heading $\psi$ to be applied to the aircraft while making a turn can be determined in known manner by integrating this angular velocity in yaw $\dot{\psi}$ relative to time by using a third component 16.

Advantageously, the use of limiters 31, 41 makes it possible to limit variations in longitudinal and lateral speeds $Va_{Long}$ and $Va_{Lat}$, and consequently to ensure a transition between ground coordination and air coordination that is progressive. Furthermore, comparing the speeds of advance of the aircraft 10 relative to the ground $(V\alpha_{sol})_{Lat}$ and relative to the air $(V\alpha_{air})_{Lat}$ makes it possible to take account of the longitudinal and lateral wind to which the aircraft 10 is subjected while determining the angular velocity in yaw $\dot{\psi}$, and consequently while determining the heading $\psi$.

Furthermore, the margin Offset and the low and high margins Offset$_{Lo}$ and Offset$_{Hi}$ may vary as a function of the speed of advance relative to the air V$\alpha_{air}$ of the aircraft 10 in order to ensure that the transition between ground coordination and air coordination takes place progressively. For example, these margins Offset, Offset$_{Lo}$, and Offset$_{Hi}$ are constant at low speeds of advance of the aircraft 10 relative to the air V$\alpha_{air}$, and they are reduced down to zero at high speeds of advance of the aircraft 10 relative to the air V$\alpha_{air}$.

Furthermore, as shown in FIG. 4, the second component 40 may include a compensator 46 positioned upstream from the first multiplier 44 in order to take account of a lateral load factor of the aircraft 10 while hovering when calculating the angular velocity in yaw $\dot{\psi}$.

Furthermore, the pilot of the aircraft 10 may modify the heading of the aircraft 10 during a turn transparently, while maintaining the same flight track T$_{sol}$ relative to the ground in order to improve outside visibility or the comfort of occupants of the aircraft 10, for example. The turning of the aircraft 10 is then no longer coordinated and the exposure of the aircraft 10 to wind may also be modified. The method of the invention for determining an angular velocity in turning enables the heading $\psi$ as modified by the pilot to be conserved for speed to advance relative to the air V$\alpha_{air}$ that are less than or equal to a threshold speed V$_{thresh}$. In contrast, at speeds of advance relative to the air V$\alpha_{air}$ greater than the threshold speed V$_{thresh}$, turning is coordinated by the method of the invention for determining an angular velocity in yaw once the pilot of the aircraft 10 has made this modification to the heading $\psi$.

Furthermore, when such a change of the a heading $\psi$ is followed by the pilot performing a roll action transparently that modifies the course angle Tk$_{sol}$, and consequently the track T$_{sol}$ followed by the aircraft 10, the method of the invention for determining an angular velocity in turning makes it possible to take two different situations into account. When the change to the course angle Tk$_{sol}$ is less than or equal to a threshold angle, the heading $\psi$ is corrected so as to conserve a substantially unchanged difference between the course angle Tk$_{sol}$ and the heading $\psi$ as previously modified by the pilot. When the change to the course angle Tk$_{sol}$ is greater than the threshold angle, the heading $\psi$ is deduced from the angular velocity in yaw $\dot{\psi}$ as determined from the anticipation value A and the correction value B by the method of the invention for determining an angular velocity in turning.

Naturally, the present invention may be subjected to numerous variations as to its implementation. Although several embodiments are described, it will readily be understood that it is not conceivable to identify exhaustively all possible implementations. It is naturally possible to envisage replacing any of the means described by equivalent means without going beyond the ambit of the present invention.

In particular, the aircraft 10 with this system 1 of determining an angular velocity in turning is not limited to the aircraft 10 shown in FIG. 1. By way of example, the aircraft 10 may have two main rotors or it may be a hybrid helicopter.

Furthermore, the number of main blades 111, 112, 113 of a main rotor 11, and the number of secondary blades 121, 122, 123, 124 of a tail rotor 12 are not limited to the example aircraft 10 shown in FIG. 1. A main rotor 11 or a tail rotor 12 may have two, three, four, five, or even more than five blades.

What is claimed is:

1. A method of determining an angular velocity in turning for a rotary wing aircraft, the aircraft flying along a track T$_{sol}$ relative to the ground at a speed of advance V$\alpha$, which speed of advance V$\alpha$ may be determined relative to the ground in order to form a speed of advance relative to the ground V$\alpha_{sol}$ and relative to the air in order to form a speed of advance relative to the air V$\alpha_{air}$, a longitudinal direction X extending from the front of the aircraft to the rear of the aircraft, an elevation direction Z extending upwards perpendicularly to the longitudinal direction X, and a transverse direction Y extending from right to left perpendicularly to the longitudinal and elevation directions X and Z, the aircraft comprising:

at least one rotary wing having a plurality of blades of collective pitch and of cyclic pitch that are variable about respective pitch axes, the aircraft being capable of performing movements in rotation about the directions and in translation along the directions; and an autopilot for generating control signals in compliance with predefined modes of operation and in compliance with flight setpoints, the control signals being capable of causing the aircraft to form the movements in rotation and/or translation relative to the directions;

the method including the following steps:

determining a longitudinal speed V$_{Long}$ for use in determining an anticipation value A for an angular velocity in yaw $\dot{\psi}$ of the aircraft to apply during a turn, such that:

the longitudinal speed V$_{Long}$ is equal to a longitudinal speed of advance relative to the ground (V$\alpha_{sol}$)$_{Long}$ such that V$_{Long}$=(V$\alpha_{sol}$)$_{Long}$ when the longitudinal speed of advance relative to the ground lies strictly within a first interval Int1 centered on a longitudinal speed of advance relative to the ground (V$\alpha_{air}$)$_{Long}$ and of width D$_{int1}$;

the longitudinal speed V$_{Long}$ is equal to a high first boundary of the first interval Int1 when the longitudinal speed of advance relative to the ground (V$\alpha_{sol}$)$_{Long}$ is greater than or equal to the high first boundary, the high first boundary being equal to the longitudinal speed of advance relative to the air (V$\alpha_{air}$)$_{Long}$ plus a margin Offset equal to half of the width D$_{int1}$, such that:

$$\text{Offset} = \frac{D_{int1}}{2}$$

and $$V_{Long} = (V\alpha_{air})_{Long} + \frac{D_{int1}}{2}$$

the longitudinal speed V$_{Long}$ is equal to a low first boundary of the first interval Int1 when the longitudinal speed of advance relative to the ground (V$\alpha_{sol}$)$_{Long}$ is less than or equal to the low first boundary, the low first boundary being equal to the longitudinal speed of advance relative to the air (V$\alpha_{air}$)$_{Long}$ minus the margin Offset such that:

$$V_{Long} = (V\alpha_{air})_{Long} - \frac{D_{int1}}{2}$$

determining the anticipation value A for the angular velocity in yaw ($\dot\psi$) such that:

$$A = \frac{G_Y}{V_{Long}}$$

where $G_y$ is a lateral acceleration of the aircraft under the control of a pilot of the aircraft;
    determining a lateral speed $V_{Lat}$ for use in determining a correction value B of the angular velocity in yaw $\dot\psi$ for application during the turn, such that:
    the lateral speed $V_{Lat}$ is equal to a lateral speed of advance relative to the ground $(V\alpha_{sol})_{Lat}$ such that $V_{Lat} = (V\alpha_{sol})_{Lat}$ when the lateral speed of advance relative to the ground $(V\alpha_{sol})_{Lat}$ lies strictly within a second interval Int2 bounded firstly by a low second boundary equal to a first product of a first multiplier coefficient $K_1$ multiplied by a lateral load factor Ny of the aircraft minus a low margin $Offset_{Lo}$, and secondly by a high boundary equal to the first product plus a high margin $Offset_{Hi}$;
    the lateral speed $V_{Lat}$ is equal to the high second boundary when the lateral speed of advance relative to the ground $(V\alpha_{sol})_{Lat}$ is greater than or equal to the high second boundary, such that:

$V_{Lat} = K_1 \times Ny + Offset_{Hi}$ the lateral speed $V_{Lat}$ is equal to the low second boundary when the lateral speed of advance relative to the ground $(V\alpha_{sol})_{Lat}$ is less than or equal to the low second boundary, such that:

$V_{Lat} = K_1 \times Ny - Offset_{Lo}$ determining the correction value B for the angular velocity in yaw $\dot\psi$ such that:

$B = K_2 \times V_{Lat}$ $K_2$ being a second multiplier coefficient; and
    determining the angular velocity in yaw $\dot\psi$ so as to follow the track $T_{sol}$ in the turn, such that:

$\dot\psi = A + B.$

2. A method according to claim 1, for determining an angular velocity in turning for a rotary wing aircraft, wherein the margin Offset, the high margin $Offset_{Hi}$, and the low margin $Offset_{Lo}$ are variable and decrease when the speed of advance relative to the air $V\alpha_{air}$ increases.

3. A method according to claim 1, for determining an angular velocity in turning for a rotary wing aircraft, wherein the value Offset is equal to 20 kt when the speed of advance relative to the air $V\alpha_{air}$ is less than 20 kt.

4. A method according to claim 1, for determining an angular velocity in turning for a rotary wing aircraft, wherein the high margin $Offset_{Hi}$ and low margin $Offset_{Lo}$ are equal respectively to +20 kt and −20 kt when the speed of advance relative to the air $V\alpha_{air}$ is less than 20 kt.

5. A method according to claim 1, for determining an angular velocity in turning for a rotary wing aircraft, wherein the margin Offset, the high margin $Offset_{Hi}$, and the low margin $Offset_{Lo}$ are zero when the speed of advance relative to the air $V\alpha_{air}$ is greater than or equal to 70 kt.

6. A method according to claim 1, for determining an angular velocity in turning for a rotary wing aircraft, wherein the lateral load factor Ny is a factor that has been compensated in order to take account of a load factor of the aircraft while in hovering flight.

7. A method according to claim 1, for determining an angular velocity in turning for a rotary wing aircraft, wherein when the heading $\psi$ is modified by an action of a pilot of the aircraft, the modified heading $\psi$ is conserved if the speed of advance relative to the air $V\alpha_{air}$ is less than or equal to a threshold speed $V_{thresh}$.

8. A method according to claim 7, for determining an angular velocity in turning for a rotary wing aircraft, wherein the threshold speed $V_{thresh}$ is variable as a function of the longitudinal speed $V_{Long}$.

9. A method according to claim 8, for determining an angular velocity in turning for a rotary wing aircraft, wherein the threshold speed $V_{thresh}$ is constant when the longitudinal speed $V_{Long}$ is greater than or equal to 30 kt, then increases while the longitudinal speed $V_{Long}$ decreases down to 15 kt, and is constant when the longitudinal speed $V_{Long}$ is less than 15 kt.

10. A method according to claim 1, for determining an angular velocity in turning for a rotary wing aircraft, wherein when a modification of the heading $\psi$ as a result of a first action of a pilot of the aircraft is followed by a second action in roll of the pilot leading to a modification of a course angle $Tk_{sol}$ of the aircraft that is less than or equal to a threshold angle, the heading $\psi$ is modified in order to conserve an unchanging difference between the course angle $Tk_{sol}$ and the heading $\psi$.

11. A method according to claim 1, for determining an angular velocity in turning for a rotary wing aircraft, wherein when a modification of the heading $\psi$ as a result of a first action of a pilot of the aircraft is followed by a second action in roll of the pilot leading to a modification of a course angle $Tk_{sol}$ of the aircraft greater than a threshold angle, the heading $\psi$ is determined from the angular velocity in yaw $\dot\psi$ of the aircraft and from the anticipation value A and the correction value B.

12. A system for determining an angular velocity in turning for a rotary wing aircraft, the aircraft flying along a track $T_{sol}$ relative to the ground with a speed of advance $V\alpha$, the speed of advance $V\alpha$ potentially being determined relative to the ground to form a speed of advance relative to the ground $V\alpha_{sol}$ or else relative to the air in order to form a speed of advance relative to the air $V\alpha_{air}$, a longitudinal direction X extending from the front of the aircraft to the rear of the aircraft, a direction Z in elevation extending upwards perpendicularly to the longitudinal direction X, and a transverse direction Y extending from right to left perpendicularly to the longitudinal and elevation directions X and Z,
    the aircraft having at least one rotary wing provided with a plurality of blades of collective pitch and of cyclic pitch that are variable about respective pitch axes, the aircraft being capable of performing movements in rotation about the directions and in translation along the directions;
    an autopilot for generating control signals in compliance with predetermined modes of operation, the control signals being capable of causing the aircraft to move in rotation and/or in translation relative to the directions; and
    the system for determining an angular velocity in turning comprising:
        at least one component; an
        at least one memory;
    wherein the system for determining an angular velocity in turning is adapted to perform the method according to claim 1, during which the following steps are performed:
determining a longitudinal speed $V_{Long}$ for use in determining an anticipation value A for an angular velocity in yaw $\dot{\psi}$ of the aircraft to apply during a turn, such that:
the longitudinal speed $V_{Long}$ is equal to a longitudinal speed of advance relative to the ground $(V\alpha_{air})_{Long}$ such that $V_{Long}=(V\alpha_{sol})_{Long}$ when the longitudinal speed of advance relative to the ground lies strictly within a first interval Int1 centered on a longitudinal speed of advance relative to the ground $(V\alpha_{air})_{Long}$ and of width $D_{int1}$;
the longitudinal speed $V_{Long}$ is equal to a high first boundary of the first interval Int1 when the longitudinal speed of advance relative to the ground $(V\alpha_{sol})_{Long}$ is greater than or equal to the high first boundary, the high first boundary being equal to the longitudinal speed of advance relative to the air $(V\alpha_{air})_{Long}$ plus a margin Offset equal to half of the width $D_{int1}$, such that:

$$\text{Offset} = \frac{D_{int1}}{2}$$

and $$V_{Long} = (V a_{air})_{Long} + \frac{D_{int1}}{2}$$

the longitudinal speed $V_{Long}$ is equal to a low first boundary of the first interval Int1 when the longitudinal speed of advance relative to the ground $(V\alpha_{sol})_{Long}$ is less than or equal to the low first boundary, the low first boundary being equal to the longitudinal speed of advance relative to the air $(V\alpha_{air})_{Long}$ minus the margin Offset such that:

$$V_{Long} = (V a_{air})_{Long} - \frac{D_{int1}}{2}$$

determining the anticipation value A for the angular velocity in yaw ($\dot{\psi}$) such that:

$$A = \frac{G_Y}{V_{Long}}$$

where $G_y$ is a lateral acceleration of the aircraft under the control of a pilot of the aircraft;
determining a lateral speed $V_{Lat}$ for use in determining a correction value B of the angular velocity in yaw $\dot{\psi}$ for application during the turn, such that:
the lateral speed $V_{Lat}$ is equal to a lateral speed of advance relative to the ground $(V\alpha_{sol})_{Lat}$ such that $V_{Lat}=(V\alpha_{sol})_{Lat}$ when the lateral speed of advance relative to the ground $(V\alpha_{sol})_{Lat}$ lies strictly within a second interval Int2 bounded firstly by a low second boundary equal to a first product of a first multiplier coefficient $K_1$ multiplied by a lateral load factor Ny of the aircraft minus a low margin $\text{Offset}_{Lo}$, and secondly by a high boundary equal to the first product plus a high margin $\text{Offset}_{Hi}$;
the lateral speed $V_{Lat}$ is equal to the high second boundary when the lateral speed of advance relative to the ground $(V\alpha_{sol})_{Lat}$ is greater than or equal to the high second boundary, such that:

$V_{Lat}=K_1 \times Ny + \text{Offset}_{Hi}$ the lateral speed $V_{Lat}$ is equal to the low second boundary when the lateral speed of advance relative to the ground $(V\alpha_{sol})_{Lat}$ is less than or equal to the low second boundary, such that:

$V_{Lat}=K_1 \times Ny - \text{Offset}_{Lo}$ determining the correction value B for the angular velocity in yaw $\dot{\psi}$ such that:

$B=K_2 \times V_{Lat}$ $K_2$ being a second multiplier coefficient; and
determining the angular velocity in yaw $\dot{\psi}$ so as to follow the track $T_{sol}$ in the turn, such that:

$\dot{\psi}=A+B$.

13. A system according to claim 12, for determining an angular velocity in turning for a rotary wing aircraft, wherein the system comprises a first component for determining the anticipation value A for the angular velocity $\dot{\psi}$, such that:

$$A = \frac{G_Y}{V_{Long}}$$

$G_y$ being the lateral acceleration controlled by the pilot of the aircraft and $V_{Long}$ being the longitudinal speed;
the first component comprising a first limiter, a first subtracter, a first adder, and a divider;
the first subtracter and the first adder being positioned upstream from the first limiter, respectively upstream from a minimum first input Min1 and from a maximum first input Max1 of the first limiter, the first subtracter and the first adder receiving as input the longitudinal speed of advance relative to the air $(V\alpha_{air})_{Long}$ and the margin Offset and then outputting respectively a first subtraction and a first addition constituted by the longitudinal speed of advance relative to the air $(V\alpha_{air})_{Long}$ respectively minus and plus the margin Offset;
the first limiter receiving as main input the longitudinal speed of advance relative to the ground $(V\alpha_{sol})_{Long}$ and as minimum and maximum first inputs Min1 and Max1 respectively the first subtraction and the first addition and outputting the longitudinal speed $V_{Long}$ which is equal to the longitudinal speed of advance relative to the ground $(V\alpha_{sol})_{Long}$ limited to the minimum and maximum first inputs Min1 and Max1 when the longitudinal speed of advance relative to the ground $(V\alpha_{sol})_{Long}$ is respectively less than or greater than the minimum and maximum first inputs Min1 and Max1; and
the divider being positioned downstream from the first limiter, the divider receiving as inputs both a numerator constituted by the lateral acceleration $G_y$ of the aircraft as controlled by a pilot of the aircraft and a denominator constituted by the longitudinal speed $V_{Long}$, and then outputting the lateral acceleration $G_y$ divided by the longitudinal speed $V_{Long}$ corresponding to the anticipation value A for the angular velocity $\dot{\psi}$ in yaw for application to the aircraft.

14. A system according to claim 12, for determining an angular velocity in turning for a rotary wing aircraft, wherein the system comprises a second component for determining the correction value B for the angular velocity $\dot{\psi}$, such that:

$B=K_2 \times V_{Lat}$ $V_{Lat}$ being the lateral speed and $K_2$ being the multiplier coefficient;

the second component comprising a second limiter, a second subtracter, a second adder, and two multipliers:
a first multiplier being positioned upstream from the second subtracter and from the second adder, the first multiplier receiving as input the first multiplier coefficient $K_1$ and the lateral load facto Ny and delivering as output a first product of the first multiplier coefficient $K_1$ multiplied by the first lateral load factor Ny;

the second subtracter and the second adder being positioned upstream from the second limiter, respectively upstream from a minimum second input Min2 and a maximum second input Max2 of the second limiter, the second subtracter and the second adder receiving as input the first product and respectively the low margin $Offset_{Lo}$ and the high margin $Offset_{Hi}$ and outputting respectively a second subtraction of the first product minus the low margin $Offset_{Lo}$ and a second addition of the first product plus the high margin $Offset_{Hi}$;

the second limiter receiving as main input the lateral speed of advance relative to the ground $(V\alpha_{sol})_{Lat}$ and as minimum and maximum second inputs Min2 and Max2 respectively the second subtraction and the second addition, and delivering as output the lateral speed $V_{Lat}$, which is equal to the lateral speed of advance relative to the ground $(V\alpha_{sol})_{Lat}$ limited to the minimum and maximum second inputs Min2 and Max2 when the lateral speed of advance relative to the ground $(V\alpha_{sol})_{Lat}$ is respectively less than or greater than the minimum and maximum second inputs Min2 and Max2; and a second multiplier being positioned downstream from the second limiter and receiving as input the lateral speed $V_{Lat}$ and the second multiplier coefficient $K_2$, and outputting a second product of the lateral speed $V_{Lat}$ multiplied by the second multiplier coefficient $K_2$ corresponding to the correction value B of the angular velocity $\psi$ in yaw for application to the aircraft.

15. A system according to claim 14, for determining an angular velocity in turning for a rotary wing aircraft, wherein the second component includes a compensator positioned before the first multiplier in order to take account of a lateral load factor of the aircraft in hovering flight.

* * * * *